US012741351B2

(12) United States Patent
Sarikaya et al.

(10) Patent No.: US 12,741,351 B2
(45) Date of Patent: Sep. 22, 2026

(54) METHOD AND DEVICE FOR DETERMINING ROTATIONAL SLIPPAGE OF A TOOL FRICTIONALLY HELD IN A TOOL HOLDER

(71) Applicant: Haimer GmbH, Hollenbach-Igenhausen (DE)

(72) Inventors: Erkut Sarikaya, Pfungstadt (DE); Roman Morozov, Affalterbach (DE); Matthias Weigold, Hirschberg (DE)

(73) Assignee: Haimer GmbH, Hollenbach-Igenhausen (DE)

( * ) Notice: Subject to any disclaimer, the term of this patent is extended or adjusted under 35 U.S.C. 154(b) by 455 days.

(21) Appl. No.: 18/390,015

(22) Filed: Dec. 20, 2023

(65) Prior Publication Data

US 2024/0198472 A1 Jun. 20, 2024

(30) Foreign Application Priority Data

Dec. 20, 2022 (DE) ..................... 10 2022 134 045.7

(51) Int. Cl.
*B23Q 17/09* (2006.01)

(52) U.S. Cl.
CPC ..... *B23Q 17/0976* (2013.01); *B23Q 17/0961* (2013.01)

(58) Field of Classification Search
CPC ............ B23Q 17/0976; B23Q 17/0961; B23Q 17/0952; B23Q 17/09
See application file for complete search history.

(56) References Cited

U.S. PATENT DOCUMENTS

| | | | | |
|---|---|---|---|---|
| 11,084,139 | B2 * | 8/2021 | Kalhori | B23Q 17/0957 |
| 2018/0147684 | A1 * | 5/2018 | Ekback | B23Q 17/2225 |
| 2022/0134459 | A1 | 5/2022 | Dietz et al. | |

FOREIGN PATENT DOCUMENTS

| | | | |
|---|---|---|---|
| DE | 102005059122 | A1 | 7/2006 |
| EP | 3184237 | A1 | 6/2017 |
| WO | 2020193228 | A1 | 10/2020 |

OTHER PUBLICATIONS

Romeo et al. "Methods and Sensors for Slip Detection in Robotics: A Survey", IEEE Access, Jan. 1, 2020, pp. 73027-73050, vol. 8, IEEE, USA. DOI: http://dx.doi.org/10.1109/ACCESS.2020.2987849.

* cited by examiner

*Primary Examiner* — Sabbir Hasan
(74) *Attorney, Agent, or Firm* — Lawrence A. Greenberg; Werner H. Stemer; Ralph E. Locher

(57) ABSTRACT

A method and a device for determining a rotational slippage of a tool that is frictionally held in a tool holder. The rotational slippage of the tool is determined by evaluating a phase and/or a period length of a periodic process signal from the tool.

20 Claims, 2 Drawing Sheets

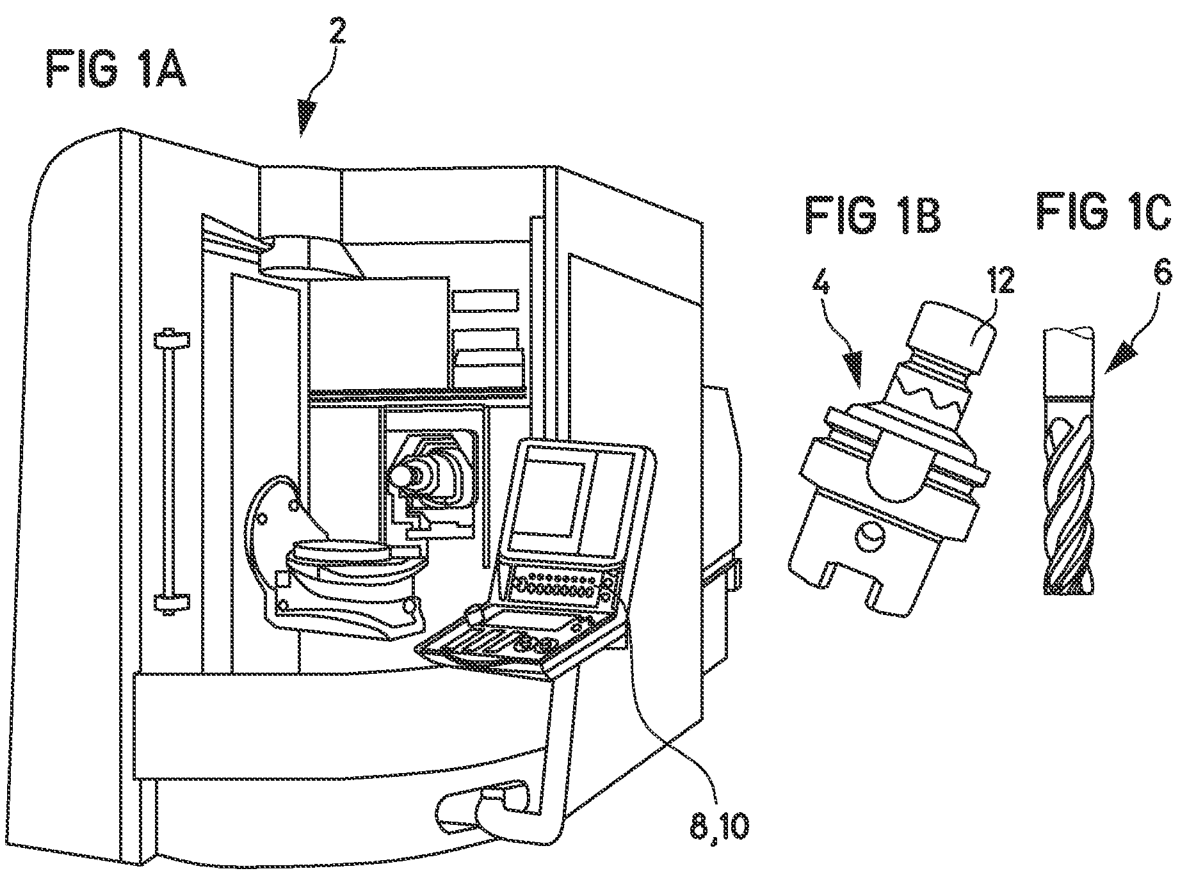
FIG 1A
2
FIG 1B
4
12
FIG 1C
6
8,10
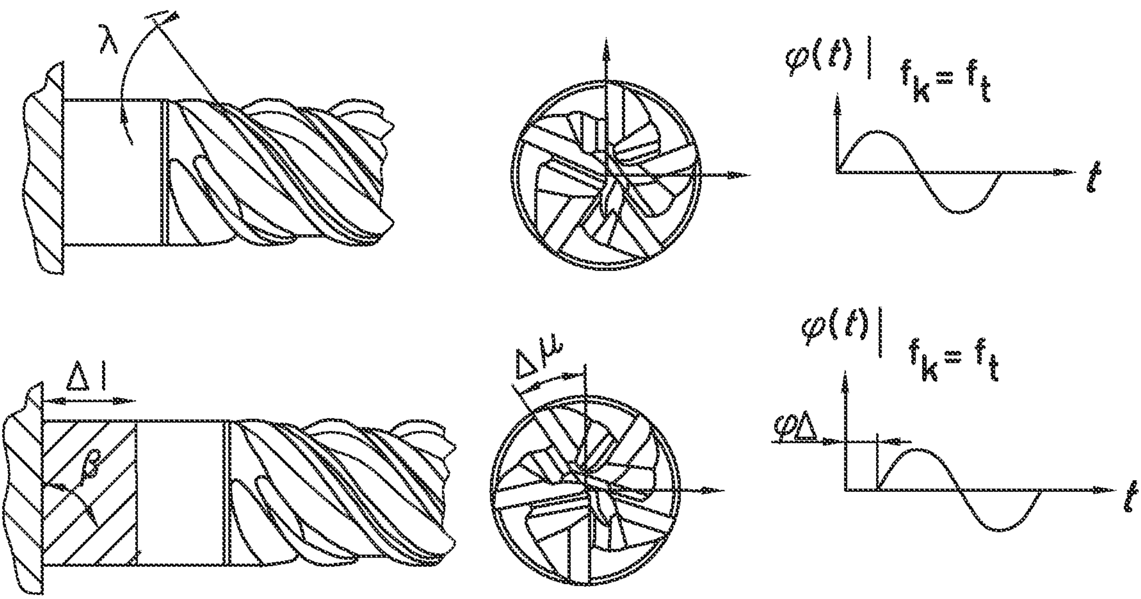
FIG 2
λ
φ(t)
f_k = f_t
t
Δl
β
Δμ
φ(t)
f_k = f_t
φΔ
t

METHOD AND DEVICE FOR DETERMINING ROTATIONAL SLIPPAGE OF A TOOL FRICTIONALLY HELD IN A TOOL HOLDER

CROSS-REFERENCE TO RELATED APPLICATION

This application claims the priority, under 35 U.S.C. § 119, of German Patent Application DE 10 2022 134 045.7, filed Dec. 20, 2022; the prior application is herewith incorporated by reference in its entirety.

FIELD AND BACKGROUND OF THE INVENTION

The invention relates to a method and a device for determining rotational slippage of a tool frictionally held in a tool holder, such as an end mill in a chuck, during machining in particular with a geometrically determined cutter.

The machining of materials is a branch of production technology and deals with the processing of workpieces made of specific materials that may possibly be difficult to machine, such as titanium alloys, with the aid of machine tools.

It is known that during the machining of workpieces, in particular those made of materials that are difficult to machine, axial slippage—and as a result—tool pull-out can occur, which can lead to losses in quality in fabricated parts—or even to tool breakage, such as breakage of the aforementioned end mill.

The occurrence of tool pull-out may in theory be traced back to the production of axial slippage in a frictional tool-tool holder connection. This occurs as a result of a load-dependent drop in tension at a press joint on the shaft-hub or tool-tool holder connection, so that the connection is weakened and a relative sliding movement between shaft-hub or tool-tool holder is made possible.

Such sliding movements—in the axial direction—may be designated below in a simplified and clear manner as axial slippage or pull-out and those—in the circumferential direction—as rotational slippage.

Accordingly, existing solutions for preventing slippage and tool pull-out in tools frictionally held in tool holders are aimed at either improving the frictional connection between tool and tool holder, such as by laser-induced roughening of the tool shaft surface (as a result of which a frictional component on the joining surface rises and slippage is considerably reduced), or supporting the tool-tool holder connection by means of an additional form fit, such as in the case of "Safe-Lock" (by locking elements).

The latter "form-fit-supported" solutions can be basically disadvantageous since an over-determined connection of tool and tool holder is produced, no accurate mathematical description of the tool-tool holder system is possible and therefore no predictions relating to the mechanical behavior of the components can be made either. Both the solution approaches mentioned, i.e., improvement of the frictional fit and support by an additional form fit, additionally require constructional measures and therefore increase tool and production costs.

SUMMARY OF THE INVENTION

It is accordingly an object of the invention to provide a method and device for determining a slippage of a frictionally arrested tool which overcomes the above-mentioned disadvantages of the heretofore-known devices and methods of this general type and which provides for an improvement by means of which tool pull-out can be detected and/or prevented and/or compensated without the disadvantages associated with the prior art.

With the above and other objects in view there is provided, in accordance with the invention, a method for determining rotational slippage of a tool that is frictionally held in a tool holder, the method comprising:

- measuring a phase and/or a period length of a periodic process signal from the tool that is frictionally held in the tool holder; and
- determining a rotational slippage of the tool by evaluating at least one of a phase or a period length of the periodic process signal.

Terms which may be used, such as top, bottom, front, rear, left or right are—if not otherwise explicitly defined—to be understood in accordance with common understanding—also when viewing the present figures. Terms such as radial and axial, if used and not otherwise explicitly defined, are to be understood in relation to the mid-axes or axes of symmetry of components described here—also when viewing the present figures.

The term "substantially"—if used—can be understood (according to the understanding of the highest court) to refer to "a still considerable extent in practice." Possible deviations from the exact thus implied by this terminology can thus arise without intention (that is to say without any functional justification) because of production or mounting tolerances and so on.

In the method for determining rotational slippage of a tool frictionally held in a tool holder, provision is made to determine rotational slippage of a tool frictionally held in the tool holder by evaluating a phase and/or a period length of a periodic process signal from the tool.

"Process signal" from the tool means a signal that can be detected during a (machining) process of the tool and represents this process, for example a spindle current of the machine tools during workpiece machining—or a signal that can be generated by sensors on the tool, on the tool holder or on the machine tool and represents this process, for example a load on the tool.

"Periodic" also means that an event occurring again and again—repeating periodically (over time) during the process—is reflected in the periodicity or by the periodicity of the "periodic" process signal.

Such an event occurring again and again periodically in the process can be, for example, a tooth engagement of the machining tool, such as a milling tool, during the machining of a workpiece, which can be detected for example in the spindle current or the load, for example a force signal, an acceleration signal and/or a vibration signal—as the periodic process signal that can be used by the invention.

The solution proposed by the invention in order to detect and/or to prevent and/or to compensate for tool pull-out is firstly based on the finding that a cause of the tool pull-out is that a rotation, i.e., the rotational slippage—and thus a helical movement form/sliding movement (of the tool in the tool holder) superimposed on axial slippage of frictional tool-tool holder connections arises under circumferential load (such as during a (machining) process of a workpiece, for example machining of a workpiece).

Expressed simply, axial slippage and rotational slippage always occur together.

If rotational slippage (under load or in the process) can thus be detected, it can also be used to infer existing axial slippage and thus as a result tool pull-out.

Correlative relationships between rotational slippage and axial slippage can thus additionally also permit quantitative determination of tool pull-out, i.e., in simplified and clear form, a tool pull-out length. For example—if the (tool) pull-out twist angle is known—the axial slippage and the tool pull-out/the tool pull-out length could thus be determined from the rotational slippage.

To express it clearly, the detection of rotational slippage is data-driven by the invention, by using a periodic process signal from the tool.

Central here are the periodic properties of such a process signal such as—as used by the invention—its phase and/or period length. Here, it has been recognized that the phase or its phase angle and/or the period length of a periodic process signal change/s when slippage or rotational slippage occurs.

Changes can be determined—and thus rotational slippage can be detected—by comparison (with, in particular generated, "ideal" (i.e., "(rotational) slippage-free")) reference signals).

Expressed clearly, the rotational slippage will be reflected in the vibrational properties of the periodic process signal and will lead to a change in the aforementioned properties, namely in the phase or phase angle and/or period/period length.

Expressed in another way and mathematically, the rotational slippage leads to a time-dependent phase angle at the event frequency.

The time-dependent phase angle (at the event frequency) can be determined or calculated, for example, as a result of the fact that the periodic process signal or its phase/phase angle is compared with a, for example artificially generated, in particular "ideal" reference signal or the phase/phase angle of the latter. This also correspondingly applies to the period length induced by rotational slippage.

Comparisons of period lengths and/or the analysis of the phase shift—in the periodic process signal itself—may simply also be sufficient here.

In other words, rotational slippage (during the process) will cause an—analyzable—change in the period length and/or an—analyzable—phase shift in the periodic process signal.

A data-driven analysis of the phase and/or the period length of the periodic process signal thus detects and supplies the rotational slippage of a tool held frictionally in the tool holder. If rotational slippage is thus detected, axial slippage and tool pull-out are also present. The resulting tool pull-out can be compensated for via appropriate monitoring of the rotational slippage and/or further tool pull-out can be prevented after appropriate adjustment of the process parameters.

The same applies to tools having a defined angular position of the cutters. When rotational slippage occurs, the rotational slippage angle can be determined and compensated for by suitable measures and/or further rotational slippage can be prevented.

The data-driven approach saves costly constructional measures during the avoidance of the tool pull-out (cf. the above first and second solution approaches in the prior art, i.e., improvement of the frictional connection and support by an additional form fit) and offers a more universal solution, since monitoring or control is possible independent of the configuration of the tool-tool holder connection.

The requirements on the implementation are low, it is merely necessary for a periodic process signal to be present and detected (which may possibly already be present—as in the case of the spindle current—without additional sensors), by using which a (tool-typical) event that occurs periodically again and again (e.g. the tooth engagement or the tooth engagement frequency) can be detected.

In addition, the analytical method is stable against interference and noise, since these signal components are filtered, for example by a bandpass filter. Because of the real-time capability, complete tool pull-out compensation is potentially conceivable.

It is thus expedient in particular if the periodic process signal is a spindle current, since internal machine data is sufficient here and no additional measuring device or sensors is or are required. In addition, the periodic process signal can be a force signal, an acceleration signal and/or an acoustic or other type of vibration signal—which can thus be achieved by appropriate sensors (on the tool, tool holder and/or on the machine tool/spindle).

In a development, provision can also be made for the tool to be a machining tool, in particular a milling tool, a turning tool, a grinding tool or a boring tool, in particular an end mill, and/or for the tool holder to be a chuck, in particular a shrink chuck, a collet chuck, a hydro expansion chuck or an HG chuck.

Furthermore, it is expedient if the periodic process signal is filtered, smoothed, standardized and/or a trend in the periodic process signal is eliminated, in order thus to make an amplitude profile of the periodic process signal as far as possible independent of process parameters. Put simply and clearly, the influence of errors (over time) is excluded from the periodic process signal. This may be advantageous in particular during subsequent analyses of the slippage behavior of the tool-tool holder connection and/or its optimization.

In particular, in a development, provision can also be made for the periodic process signal to be compared with an in particular artificially generated periodic reference signal.

It is expedient (for the comparison) if a periodically repeating event in the periodic process signal is also included as the periodically repeating event in the in particular artificially generated periodic reference signal.

In a development, provision can also be made for the phase and/or the period length in the periodic process signal to be compared. Put simply, here the change in the phase and/or the period length within the periodic process signal itself is determined—without another type of comparison signal, such as the aforementioned periodic reference signal, being generated or used. This is because if it is assumed that rotational slippage would occur suddenly or in a time-specific manner in the process, then a period there would have a longer period length than preceding and/or subsequent periods—in the periodic process signal.

In a development or going further, provision can then be made that when the comparison indicates a change, rotational slippage is inferred. Furthermore, it would then be possible to infer axial slippage—and in turn tool pull-out. By using the (tool) pull-out twist angle, it would thus then be possible to also determine the tool pull-out quantitatively—from the rotational slippage.

Via appropriate monitoring, in particular in real time, of the rotational slippage and of the axial slippage and/or of the tool, tool pull-out can thus be prevented, for example by adapting the process parameters. In other words, if the determined rotational slippage exceeds a predefinable limiting value, a process can be aborted and/or its process parameters, in particular cutting parameters, can be changed—or it is possible to compensate for the tool pull-out determined from the rotational slippage.

In particular, it is also expedient if the comparison of the periodic process signal with the periodic reference signal is carried out in a frequency domain.

Here, provision can also be made for the periodic process signal and the periodic reference signal to be mapped in the frequency domain by using a Fourier transformation, in particular a short-time Fourier transformation.

Furthermore, it may be expedient if, during the comparison of the periodic process signal with the periodic reference signal, a phase difference between the periodic process signal and the periodic reference signal is determined and the rotational slippage is inferred from a change, in particular a change over time, in the phase difference.

It is also possible to provide for an offset of the periodic reference signal to be initialized such that, at the start of the comparison, a phase difference between the periodic process signal and the periodic reference signal is equal to zero.

Particularly expediently, the method can be used to determine rotational slippage of an end mill frictionally held in a chuck, the periodic process signal being a spindle current, a vibration signal or a force signal and the periodically repeating event on which the periodic process signal is based being a tooth engagement.

The method can advantageously also be used to determine a tool pull-out of a tool held in a tool holder, in particular an end mill frictionally held in a chuck, the tool pull-out being determined from the rotational slippage by using a (tool) pull-out twist angle.

The device for determining rotational slippage of a tool frictionally held in a tool holder provides an evaluation unit, which is set up in such a way as to carry out the method for determining rotational slippage of a tool frictionally held in a tool holder, as described.

It is expedient in particular if the device is used in a machine tool, in particular having a tool frictionally held in a tool holder. Here, it may further be expedient if, if necessary, the machine tool, the tool holder and/or the tool has sensors which are set up to detect the periodic process signal.

The previously provided description of advantageous refinements of the invention contains numerous features, some of which are reproduced combined to form a plurality in the individual sub-claims. However, these features can expediently also be considered individually and combined to form useful further combinations—including between the arrangements/devices and methods.

Even if, in the description or in the patent claims, some terms are in each case used in the singular or in conjunction with a numeral, the scope of the invention for these terms should not be restricted to the singular or the respective numeral. Furthermore, the words “a” and “an” are not to be understood as numerals but as indeterminate articles.

The above-described properties, features and advantages of the invention and the manner in which these are achieved become clearer and considerably more comprehensible in conjunction with the following description of the exemplary embodiments of the invention, which are explained in more detail in conjunction with the drawings/figures (the same components and functions have the same designations in the drawings/figures).

It will be understood that the exemplary embodiments are used to explain the invention and do not restrict the invention to combinations of features specified therein, not even in relation to functional features. In addition, suitable features of each exemplary embodiment can also be considered explicitly in isolation, removed from an exemplary embodiment, introduced into another exemplary embodiment to supplement the same and/or combined with any one of the claims.

Advantageous developments of the invention are the subject matter of dependent claims and the following description and relate both to methods according to the invention and to the device according to the invention.

Although the invention is illustrated and described herein as embodied in a method and device for determining rotational slippage of a tool frictionally held in a tool holder, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

FIG. 1A shows a perspective view of a machine tool with a tool that is frictionally held in a tool holder according to an embodiment of the invention;

FIG. 1B shows the tool holder separately;

FIG. 1C shows the tool separately;

FIG. 2 shows illustrations which illustrate a geometric relationship between a tool pull-out and a phase shift.

DETAILED DESCRIPTION OF THE INVENTION

Figure 3:
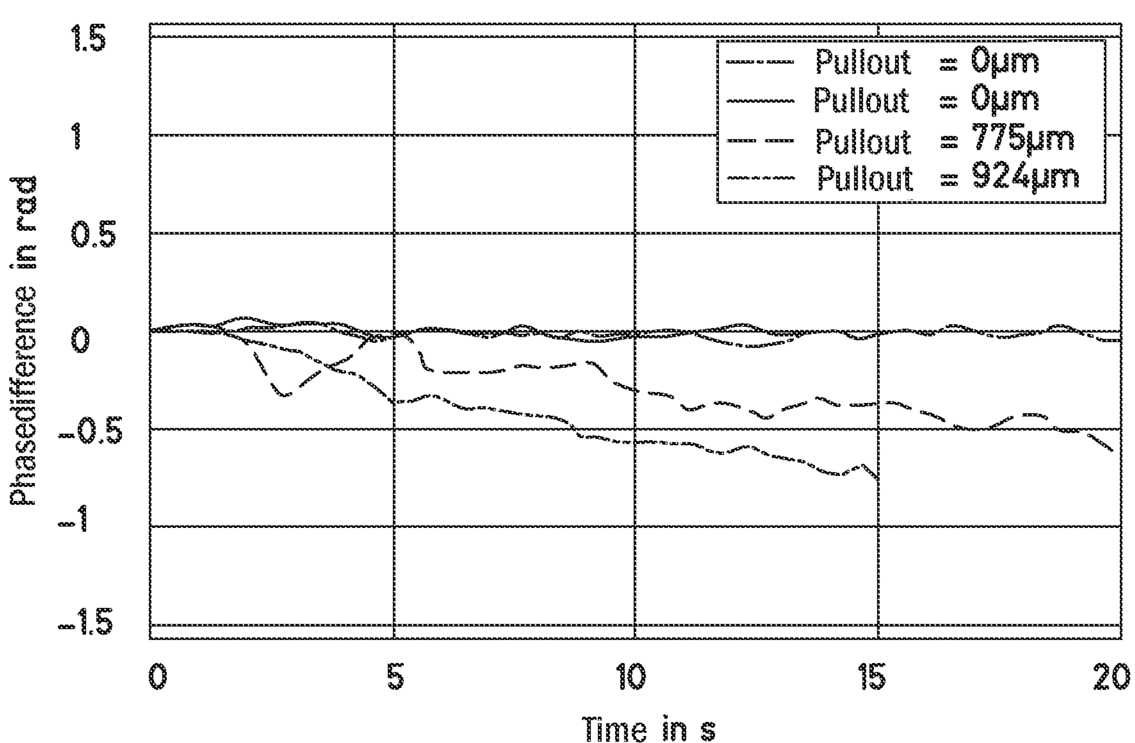
FIG. 3 shows phase variations of periodic process signals—with and without tool pull-out.

First, we shall describe the data-driven identification of slippage/tool pull-out of a (rotating) frictional tool-tool holder connection during machining:

FIG. 1A shows a machine tool 2, here a milling machine 2, having a tool 6 frictionally held in a tool holder 4, here in a collet chuck 4 (illustrated in more detail and separately in FIG. 1B), here an end mill 6 (illustrated in more detail and separately in FIG. 1C) (with tool cutters N=5 and tool diameter D=16 mm), in order to carry out machining on a workpiece (not illustrated), for example made of a titanium alloy.

The machine tool 2 is also equipped—with an appropriate, i.e., appropriately set up, evaluation unit 8—in order to detect and to monitor slippage or tool pull-out during the machining.

The monitoring or identification of the slippage, i.e., the rotational and axial slippage, or tool pull-out is carried out in a data-driven manner—by using a (periodic) process signal (detected by measurements during the machining), i.e., in this case of the spindle current $y_{Sp}$ of the machine tool 2 that can be tapped off in the internal machine controller 10 (or is present as data there).

Now we shall describe the mathematical principles of the monitoring:

Example 1: Analysis Via a Comparison Between Process Signal and (Artificially Generated) Reference Signal Within the context of pre-processing (data pre-processing), firstly the trend of the periodic profile in the process signal or in the spindle current $y_{Sp}$ is eliminated. The process signal is then standardized, so that the amplitude profile present is as far as possible process parameter-independent.

A reference signal $y_{ref}(t)$—to be compared with the process signal—can be generated (artificially) from the known process parameters—cutting speed $v_C$, tool diameter D and number of tool cutters N.

After adding the auxiliary variables rotational speed n ($n=v_C/\pi*D$) and tooth engagement frequency $f_{Tooth}$ ($f_{Tooth}=N*n$), the result is a simple sinusoidal profile for the reference signal $y_{ref}(t)$:

$$y_{ref}(t)=\sin(2\pi\cdot f_{Tooth}\cdot t+\varphi_{ref,0})$$

Here, the offset $\varphi_{ref,0}$ is firstly initialized, so that the phase difference $\varphi_{diff}$ between the reference signal $\varphi_{ref}$ and the process signal or the spindle current $\varphi_{Sp}$ is equal to zero at the start of the monitoring time.

Once the generation of the artificial reference signal has been carried out, then it is finally possible to infer the phase difference $\varphi_{diff}(t)$: Now, the signals over the entire time period (of a process to be monitored) are mapped in the time-frequency domain by means of a short-time Fourier transformation and then compared by using the tooth engagement frequency:

$$\varphi_{diff}(t)=\varphi_{ref}(t)-\varphi_{Sp}(t)$$

If slippage or rotational and axial slippage and an increasing tool pull-out leads to a higher phase shift and phase difference, then the slippage or the tool pull-out during the machining can be identified and monitored by using the phase difference (as illustrated below by way of example for (trial) processes).

Adjustable maximum permissible phase differences (corresponding to maximum permissible slippages or maximum permissible tool pull-outs) can be stored in the internal machine controller 10 and (during real-time monitoring) lead to the machine tool 2 being automatically switched off.

Example 2: Analysis of the Process Signal

An alternative approach is based on time series data with a signal size of N, which is a k multiple of the data points acquired during one spindle revolution.

According to equation (1), this can be calculated by multiplying the number of k rotations by the ratio of sampling frequency $f_s$ and rotational frequency $f_{rot}$.

$$N=k\cdot\frac{f_s}{f_{rot}} \quad \text{Eq. (1)}$$

As a precondition, this signal must be sensitive enough to detect the periodic tooth engagement. The sensitivity can be quantified by using the signal to noise ratio of the signal amplitude at the tooth engagement frequency, which must be at least greater than 0 dB.

The tooth engagement frequency $f_t$ can be described as an $n_t$ multiple of the rotational frequency $f_{rot}$, where $n_t$ is the number of cutting edges.

$$f_t=n_t\cdot f_{rot} \quad \text{Eq. (2)}$$

Firstly, the time series signal is transformed into the spectral domain in order to ensure improved representation of the signal amplitude at the tooth engagement frequency. For a given discrete time domain signal $y_n$, the discrete Fourier transformation is defined as follows:

$$Y(f_k)=\sum_{n=0}^{N-1}y_n\cdot e^{-\frac{i2\pi}{N}f_k\cdot n} \quad \text{Eq. (3)}$$

The transformed frequency domain signal $Y(f_k)$ then consists of complex data points, which can be broken down into their magnitude and their phase:

$$Y(f_k)=\mathrm{Re}\{Y(f_k)\}+i\cdot\mathrm{Im}\{Y(f_k)\} \quad \text{Eq. (4)}$$

where $$\hat{y}(f_k)=|Y(f_k)|=\sqrt{\mathrm{Re}\{Y(f_k)\}^2+\mathrm{Im}\{Y(f_k)\}^2} \quad \text{Eq. (5)}$$

and $$\varphi(f_k)=\arg(Y(f_k))=\tan^{-1}\frac{\mathrm{Re}\{Y(f_k)\}}{\mathrm{Im}\{Y(f_k)\}} \quad \text{Eq. (6)}$$

Eq. (5) and Eq. (6) with $\hat{y}$ and $\varphi$ are designated as the amplitude spectrum and phase spectrum. The signal size at the tooth engagement frequency $\hat{y}(f=f_t)$ is viewed as a measure of the signal sensitivity in relation to the tooth engagement, while $\varphi(f=f_t)$ represents the primary measure for the detection of the tool rotational slippage or pull-out.

Therefore, the phase difference between the current phase of the last obtained data packet $\varphi_i$ and the phase of the first obtained data packet $\varphi_0$ is calculated continuously in order to quantify the rotation during the process.

$$\Delta\varphi=|\varphi_i-\varphi_0| \quad \text{Eq. (7)}$$

The ratio $\Delta\varphi/n_t$ between the phase difference $\Delta\varphi$ and the number of cutters $n_t$ describes the angular displacement of the relative rotation between tool and tool holder (circumferential angle, rotational slippage).

However, in order to obtain the new tool offset, which is correlated with the relative axial movement, further calculations have to be carried out.

Therefore, the circumferential angle of the rotational movement is firstly converted into the arc length $\Delta u$, as illustrated in FIG. 2, which in turn depends on the tool diameter $D_t$:

$$\Delta u=\frac{\Delta\varphi}{n_t}\cdot\frac{\pi}{360^\circ}\cdot D_t \quad \text{Eq. (8)}$$

Next—as illustrated in FIG. 2—$\beta$ is introduced as the (tool) pull-out twist angle $\beta$ of the helical movement during tool pull-out. The relative axial tool displacement can be determined therefrom as follows:

$$\Delta l = \frac{\Delta u}{\tan \beta} \quad \text{Eq. (9)}$$

Now we shall describe the verification of the monitoring by using trial processes (cf. Table 1 and FIG. 3)

The process signal—for the processes to be monitored—originates from milling trials on the machine tool 2 when processing the workpiece 6 by synchronous milling.

The tool 6 was fixed in the tool holder 4 via the union nut 12 by means of a torque wrench (in trials (a) with a higher tightening torque (here 136 Nm) and (b) with a lower tightening torque (here, 56-80 Nm)), as a result of which the tool 6 was mounted frictionally in the tool holder 4—once more frictionally (in (a)) and once less frictionally (in (b)).

The different tightening torques of the union nut 12 (according to (a) and (b)) in turn lead to a differently formed press joint between the tool 6 and tool holder 4. A reduced tightening torque, as according to the trials (b), leads to a weakly pronounced press joint pressure and thus to a component connection that is prone to slippage and pull-out.

The cutting parameters illustrated—tooth advance $f_z$ (cf. table 1, in the columns there), and radial width of cut $a_e$ (cf. table 1, in rows there)—are chosen by using prior trials such that pull-out can be prevented under control or permitted.

After each trial, the tool length of the tool 6 is measured by means of a laser sensor (not illustrated). By means of referencing to the initial length (before the trial), the tool pull-out present can ultimately be determined. This is in each case entered in the cells of table 1.

Table 1 thus shows an overview of the pull-out trials (a) and (b) carried out on the machine tool 2. The cutting speed $v_C$ and the axial width of cut $a_p$ in each case remain unchanged at 80 m/min and 45 mm.

TABLE 1

| Tool pull-out in axial direction | | Tooth advance $f_z$ in mm: 0.06 | 0.08 |
|---|---|---|---|
| Radial width of | 1 | 0 μm | 0 μm |
| cut $a_e$ in mm | 1.5 | 0 μm | 0 μm |
| Radial width of | 1 | 775 μm | 924 μm |
| cut $a_e$ in mm | 1.5 | 1025 μm | — |

(a) Tightening torque of union nut: 136 Nm (maximum)
(b) Tightening torque of union nut: 56-80 Nm (reduced)

FIG. 3 shows by way of example the phase difference profiles highlighted (in bold) in table 1, determined from spindle current data of the internal machine control data of the internal machine controller 8 during the respective linear milling operation.

It can be seen from FIG. 3 that the profiles of the phase difference without any tool pull-out (pull-out=0 μm) remain constant, while the phase difference profiles with tool pull-out (pull-out=775 μm and pull-out=924 μm) exhibit a falling trend.

This means it was possible to verify the fact that an increased tool pull-out leads to a higher phase shift. This causal relationship was confirmed statistically by repeated trials.

The data-driven approach saves costly constructional measures during the detection or avoidance or compensation of the tool pull-out and offers a more universal solution, since process parameter-independent monitoring or control is possible.

The requirements on the implementation are low; it is merely necessary to detect a periodic process signal, such as the spindle current here, by using which the tooth engagement frequency can be detected.

Trials (with the spindle current) have shown that even internal machine data, if available, is sufficient for the purpose, and no additional measuring device is required.

In addition, the analytical method is stable against interference and noise, since these signal components are filtered out by a bandpass filter. Because of the real-time capability, complete pull-out compensation is potentially conceivable.

Although the invention has been illustrated and described in more detail through the preferred exemplary embodiments, the invention is not restricted by the examples disclosed and other variants can be derived therefrom without departing from the protected scope of the invention.

The following is a summary list of reference numerals and the corresponding structure used in the above description of the invention:

2 Machine tool
4 Tool holder, chuck, collet chuck
6 Tool, milling tool, end mill
8 Evaluation unit
10 Internal machine controller
12 Union nut

The invention claimed is:

1. A method for determining rotational slippage of a tool that is frictionally held in a tool holder, the method comprising:

measuring a phase and/or a period length of a periodic process signal from the tool that is frictionally held in the tool holder; and determining a rotational slippage of the tool by evaluating at least one of a phase or a period length of the periodic process signal.

2. The method for determining the rotational slippage according to claim 1, wherein the periodic process signal is an electrical signal.

3. The method for determining the rotational slippage according to claim 1, wherein the periodic process signal is at least one signal selected from the group consisting of a spindle current, a force signal, an acceleration signal, an optical signal, an acoustic signal, and a vibration signal.

4. The method for determining rotational slippage according to claim 1, wherein the tool is a machining tool.

5. The method for determining rotational slippage according to claim 4, wherein the machining tool is a tool selected from the group consisting of a milling tool, a turning tool, a grinding tool, and a boring tool.

6. The method for determining rotational slippage according to claim 5, wherein the machining tool is an end mill.

7. The method for determining rotational slippage according to claim 1, wherein the tool holder is a chuck.

8. The method for determining rotational slippage according to claim 7, wherein the chuck is selected from the group consisting of a shrink chuck, a collet chuck, and a hydro expansion chuck.

9. The method for determining rotational slippage according to claim 1, which comprises further processing the periodic process signal by filtering, smoothing, standardizing, and/or eliminating a trend of the periodic process signal.

10. The method for determining rotational slippage according to claim 1, which comprises comparing the periodic process signal with an artificially generated periodic reference signal, and including a periodically repeating event in the periodic process signal as a periodically repeating event in the artificially generated periodic reference signal, and comparing at least one of the phase, the period length in the periodic process signal, or the periodic reference signal.

11. The method for determining rotational slippage according to claim 10, which comprises, when the comparing step indicates a change over time, inferring rotational slippage.

12. The method for determining rotational slippage according to claim 10, which comprises carrying out the step of comparing the periodic process signal with the periodic reference signal in a frequency domain.

13. The method for determining rotational slippage according to claim 12, which comprises carrying out the comparing step by mapping the periodic process signal and the periodic reference signal in the frequency domain by using a Fourier transform.

14. The method for determining rotational slippage according to claim 10, which comprises, during a comparison of the periodic process signal with the periodic reference signal, determining a phase difference between the periodic process signal and the periodic reference signal and inferring rotational slippage from a change in the phase difference.

15. The method for determining rotational slippage according to claim 10, which comprises initializing an offset of the periodic reference signal such that, at a start of the comparison, a phase difference between the periodic process signal and the periodic reference signal is equal to zero.

16. The method for determining rotational slippage according to claim 9, wherein the periodic process signal is a spindle current or a force signal or a vibration signal, and the periodically repeating event on which the periodic process signal is based is a tooth engagement.

17. The method for determining rotational slippage according to claim 1, which comprises determining a tool pull-out of a tool mounted in a tool holder and determining the tool pull-out from a rotational slippage by using a pull-out twist angle.

18. The method for determining rotational slippage according to claim 1, wherein, when the determined rotational slippage exceeds a predefined threshold value, aborting a process and/or changing its process parameters, or compensating a tool pull-out determined from the rotational slippage.

19. A device for determining rotational slippage of the tool that is frictionally held in the tool holder, the device comprising an evaluation unit configured to carry out the method according to claim 1.

20. The device for determining rotational slippage according to claim 19, further comprising sensors configured to detect the periodic process signal disposed on at least one of a machine tool, a tool holder, or a tool.

* * * * *